_United States Patent Office_ 3,020,643
Patented Feb. 13, 1962

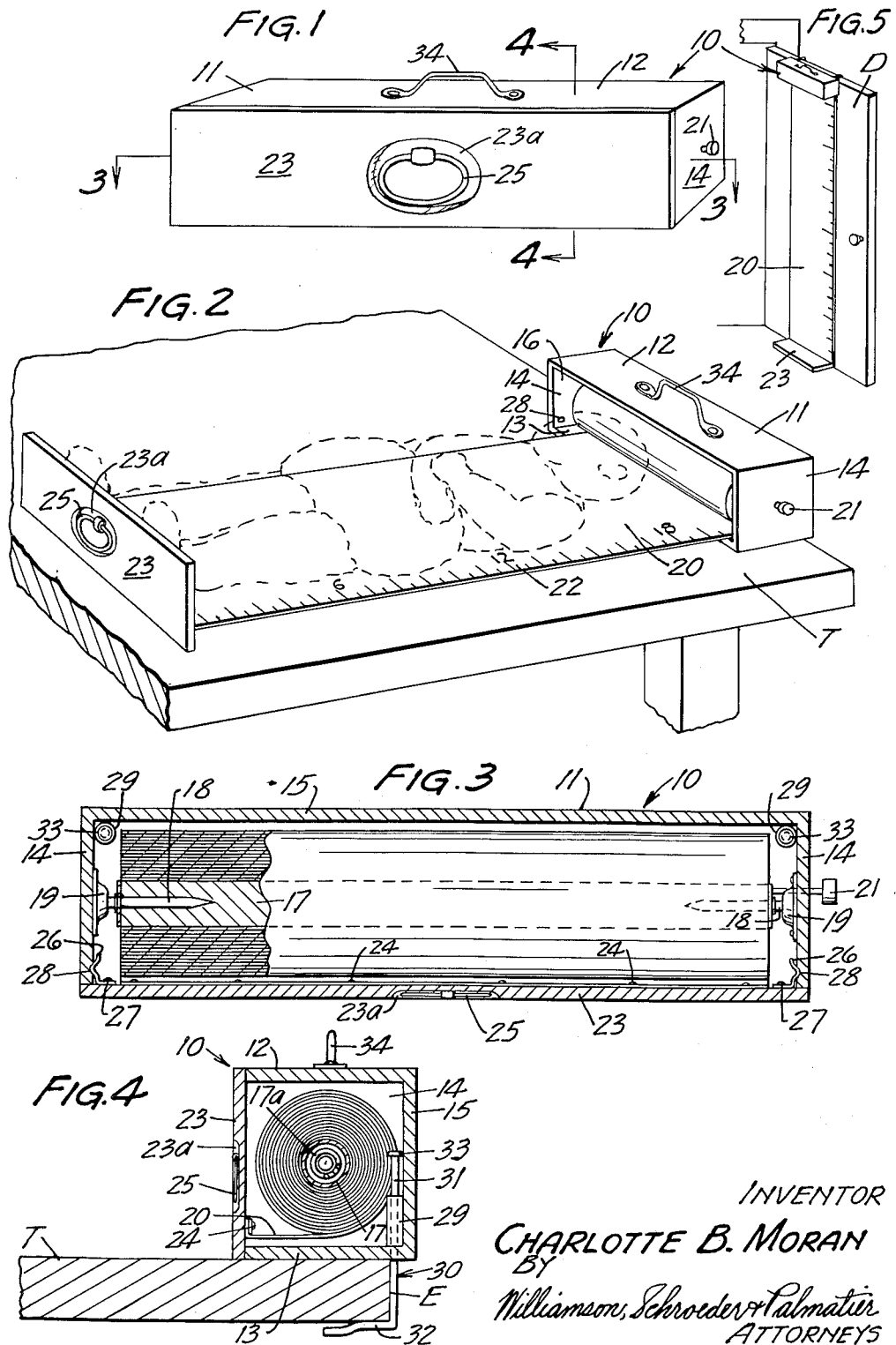

**3,020,643
COLLAPSIBLE INFANT HEIGHT MEASURING
DEVICE
Charlotte B. Moran, 1866 Meadowview Road,
Minneapolis, Minn.
Filed July 6, 1959, Ser. No. 825,200
4 Claims. (Cl. 33—138)**

This invention relates to measuring apparatus and more specifically to apparatus for measuring the heights of children.

The general object of this invention is to provide a novel and improved child measuring apparatus, of simple and inexpensive construction, including measuring means extensibly and retractably mounted within a housing and readily adaptable for measuring the heights of children.

Another object of this invention is to provide a novel and improved child measuring apparatus including a housing having securing means shiftably mounted thereto and having measuring means disposed therein and arranged and constructed to be selectively extended or retracted to thereby permit the height of a child to be measured.

A still more specific object of this invention is to provide a novel and improved child measuring apparatus including elongated measuring means extensibly and retractably secured within the housing and having a foot-engaging element secured to one end thereof and adapted to be engaged by the feet of a child when the measuring device is extended whereby the height of the child may be measured.

These and other objects and advantages of this invention will more fully appear from the following description, made in connection with the accompanying drawings, wherein like reference characters refer to the same or similar parts throughout the several views, and in which:

FIG. 1 is a view in perspective of my novel measuring apparatus in its retracted or closed condition;

FIG. 2 is a view in perspective of the novel measuring apparatus attached to a table with the measuring sheet in its unrolled condition;

FIG. 3 is a longitudinal section taken on lines 3—3 of FIG. 1 looking in the direction of the arrows; and FIG. 4 is a vertical section taken on lines 4—4 of FIG. 1 and looking in the direction of the arrows.

FIG. 5 is a perspective view indicating another manner of using my novel measuring apparatus.

Referring now to the drawings, in one embodiment of my invention the novel child measuring apparatus is designated generally 10 and includes an elongated housing 11 of generally rectangular shape. Housing 11 may be formed of any suitable rigid material such as plastic, metal, wood or the like and is comprised of peripheral wall portions including a top wall 12, bottom wall 13 and spaced upstanding end walls 14 and a rear wall 15. It is essential that at least one peripheral wall portion be substantially flat, as bottom wall 13 in the instant application, to thereby permit the measuring apparatus to be detachably secured to a substantially flat surface as shown in FIG. 2 in a manner later to be described. Referring now to FIG. 2, it will be seen that when the measuring apparatus 10 is being used, the top, bottom and end walls thereof define an opening 16 which permits the measuring element to be extended and retracted relative thereto.

A roller 17, as seen in FIG. 3, is disposed within and rotatably mounted to end walls 14 of housing 11. Roller 17 is elongated and positioned longitudinally of housing 11 and is provided with axially extending pins 18 which are journalled in bearings 19 secured to the inner surface of the end walls 14. At least a portion of roller 17 is hollow, as seen in FIG. 4, and is provided with a conventional coil spring 17a to bias the same against rotation in one direction in a well known manner.

An elongated flexible sheet 20 has one end thereof secured to roller 17 and is wound thereon. Sheet 20 is adapted to be selectively rolled from and rolled upon roller 17 and in the embodiment shown extension or unrolling of sheet 20 is against the bias of coil spring 17a. Although not shown in the drawings, roller 17 may be provided with a ratchet-type locking mechanism of the type used in conventional rollable shade structures whereby extension of the same permits the roller to be locked against the bias of the spring. The roller 17 may be unlocked when flexible sheet 20 is unrolled therefrom by pressing a release button 21 mounted on one of the end walls 14. It is to be understood, of course, that the locking mechanism described above and the release means forms no part of the present invention.

Sheet 20 may be formed of a suitable, flexible, washable material such as plastic or the like and is provided with measuring indicia 22 on one surface thereof. Referring now to FIG. 4, it will be seen that the outer end of flexible sheet 20 is secured to a foot plate 23 adjacent the lower side thereof by any conventional means such as bolt 24. Foot plate 23 is recessed as at 23a and has a ring-type handle or finger-gripping means 25 positioned within the recess and secured to foot plate 23 to thereby provide a means for facilitating extension of flexible sheet 20. Referring now to FIGS. 1 and 4, it will be seen that foot plate 23 also serves to close opening 16 when flexible sheet 20 is retracted or rolled upon rollers 17 and latching means are provided for holding said foot plate in its closed condition. The latching means include a pair of spring clips 26 secured to the inner side of foot plate 23 adjacent the ends thereof by bolts 27 and which cooperate with recesses 28 formed on the inner side and adjacent the front edge of end walls 14. When flexible sheet 20 is extended, foot plate 23 is adapted to be engaged by the feet of a child, indicated by dotted lines in FIG. 2, to thereby permit the child to be readily measured.

When the measuring apparatus is used for measuring the heights of small infants, the apparatus may be disposed upon a supporting medium such as a table T with bottom wall 13 of housing 11 engaging the upper surface thereof. Measuring apparatus 10 is also provided with means for preventing sliding and tilting movement thereof when the apparatus is being used for measuring and includes a pair of tubular guide members 29 fixedly secured within housing 11 adjacent the rear corners thereof and having their axis substantially normal to the bottom wall 13. Each guide member 29 slidably receives a hook-shaped member 30 therein which includes a substantially straight upright portion 31 and an offset portion 32. The upper end of hook-shaped member 30 is provided with an enlarged head 33 which cooperates with offset portion 32 to limit the sliding movement of hook-member 30. Referring now to FIG. 4, it will be seen that hook-shaped member 30 is adapted to engage the edge E of table T and cooperates with bottom wall 13 to prevent sliding and tilting movement of measuring apparatus 10 when sheet 20 is extended and retracted. Thus hook-shaped members 30 are mounted for extensible and retractable movement relative to housing 11 and, of course, are adapted to be retracted when the measuring apparatus is not being used. Foot plate 23, as seen in FIG. 2, is supported in upstanding relation upon table top T.

Housing 11 may also be provided with a handle 32 secured to the top wall 12 to thereby facilitate carrying thereof when the measuring apparatus is not in use. Flexible sheet 20 may also be provided with record indicia, not shown, indicating the name, height and date.

Another manner of using my novel measuring apparatus is shown in FIG. 5 wherein the device is detachably secured to a door D. It is pointed out that foot plate 23 should be of sufficient weight to maintain sheet 20 in a somewhat taut condition when extended in the manner shown in FIG. 5. In the event that the housing 11 and foot plate 23 are formed of a light plastic material, weights may be provided for foot plate 23 in order to provide sufficient weight to maintain the sheet in a taut and extended condition. When the device is utilized in the manner shown in FIG. 5, the child or adult stands with his feet positioned upon foot plate 23 and the height of the person may be easily ascertained. It will be noted that handle 25 will be positioned within recess 23a so that the plate 23 may be flush against the floor.

It will therefore be seen from the foregoing description that I have provided a novel and improved measuring apparatus whereby a child may be quickly and easily measured and which may be collapsed or retracted when not in use for storage. It will also be seen from the preceding paragraphs that I have provided a novel child measuring apparatus having a foot plate which further functions as a closure member and have provided securing means for detachably securing the apparatus with a supporting medium to thereby render the apparatus secure against tilting and sliding movement whereby the apparatus may be safely used.

It will, of course, be understood that various changes may be made in the form, details, arrangement and proportions of the parts without departing from the scope of my invention which consists of the matter shown and described herein and set forth in the appended claims.

What is claimed is:

1. An infant measuring apparatus comprising an elongated housing having peripheral wall portions and having an elongated opening formed therein, said housing having securing means mounted thereon adapted to detachably engage the edge of a flat supporting surface, an elongated roller disposed within and rotatably mounted to opposite peripheral wall portions of said housing, an elongated flexible sheet having one end thereof secured to said roller and rolled thereon and having indicia on one surface thereof, a combination foot plate and closure secured to the other end of said sheet and adapted when said sheet is unrolled to be engaged by the feet of a child lying on the unrolled sheet whereby the height of the child may be measured, and said foot plate and closure being of a size and shape to close said housing opening when said sheet is rolled upon said roller.

2. A child measuring apparatus comprising an open topped elongated housing having peripheral wall portions and having an elongated opening formed therein, a plurality of L-shaped securing hooks mounted on said housing and being extensible and retractable relative thereto, said L-shaped securing hooks when extended having portions thereof cooperating with a wall portion of said housing for detachably embracing the edge of a flat supporting surface such as a table, an elongated roller disposed within and rotatably mounted to the opposite peripheral wall portions of said housing, an elongated flexible sheet having one end thereof secured to said roller and rolled thereon and having indicia on one surface thereof, a combination foot plate and closure secured to the other end of said sheet and adapted when said sheet is unrolled to be engaged by the feet of a child lying on the unrolled sheet whereby the height of the child may be measured, said closure being of a size and shape to close said opening when said sheet is rolled upon said roller.

3. The structure defined in claim 2 and said combination foot plate and closure is provided with latching means engageable with said housing adjacent the opening thereof for retaining said foot plate in closing relation to said housing opening when said sheet is rolled upon said roller.

4. The structure defined in claim 2 wherein said foot plate is adapted to be supported in upstanding relation upon a flat supporting surface when said sheet is unrolled.

References Cited in the file of this patent

UNITED STATES PATENTS

| 1,169,413 | Lyons | Jan. 25, 1916 |
| 1,434,528 | Crogan | Nov. 7, 1922 |
| 2,686,367 | Staggs | Aug. 17, 1954 |

FOREIGN PATENTS

| 410,294 | France | Mar. 11, 1910 |